United States Patent
Sakai et al.

(10) Patent No.: US 6,775,712 B2
(45) Date of Patent: Aug. 10, 2004

(54) NETWORK SYSTEM IN WHICH PLURALITY OF IMAGE PROCESSING APPARATUSES ARE CONNECTED

(75) Inventors: Akihiko Sakai, Kawasaki (JP); Tadashi Suzuki, Tokyo (JP); Masanori Sakai, Yokohama (JP); Satoru Kutsuwada, Kawasaki (JP); Satoshi Kaneko, Kawasaki (JP); Masahito Yamamoto, Yokohama (JP); Yoshinori Abe, Tama (JP); Masahiro Kurahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/209,097

(22) Filed: Aug. 1, 2002

(65) Prior Publication Data

US 2002/0191200 A1 Dec. 19, 2002

Related U.S. Application Data

(60) Continuation of application No. 09/334,380, filed on Jun. 16, 1999, now Pat. No. 6,493,757, which is a division of application No. 08/423,966, filed on Apr. 18, 1995, now Pat. No. 5,935,217.

(30) Foreign Application Priority Data

Apr. 19, 1994 (JP) .............................................. 6-080712
Apr. 20, 1994 (JP) .............................................. 6-082010

(51) Int. Cl.[7] .............................................. G06F 15/16
(52) U.S. Cl. ...................... 709/249; 709/222; 709/229; 709/8
(58) Field of Search ................................. 709/249, 222, 709/8, 203, 205, 226–229; 710/8, 305, 306, 62, 63–64, 316

(56) References Cited

U.S. PATENT DOCUMENTS 4,791,492 A    12/1988   Nagashima et al.

(List continued on next page.)

FOREIGN PATENT DOCUMENTS

DE    4041442    6/1992

Primary Examiner—Paul R. Myers
Assistant Examiner—Raymond N Phan
(74) Attorney, Agent, or Firm—Morgan & Finnegan, LLP

(57) ABSTRACT

The present invention is to allow display based on the setting positions of devices in selection of a desired device to be used, and facilitate selection considering the setting positions of the devices. The present invention can also display equipments so as to allow discrimination between an equipment included in an image processing apparatus and an equipment connected on a communication line. Equipments in a network environment are placed on the first floor (1F), the second floor (2F), and the third floor (3F) in a building and connected through a network (LAN 1300). For example, a computer (1310) collects device information including status information and setting position information from usable input/output devices. For example, status information representing "BUSY" and setting position information representing "3F-B block" are transferred from a virtual optical scanner (1302). The computer (1310) displays the connected input/output devices together with the setting position information obtained from the devices. An image processing apparatus (100) has various input/output devices including a reader unit (1), a printer unit (2), and an image input/output control unit (3). In addition, various input/output equipments (two optical scanner devices (1302, 1303) and three facsimile transmission/reception devices (1305, 1306, 1307)) are connected to the image processing apparatus (100) through a LAN interface unit (9) and the LAN (1300). A CPU (123) of a core unit (10) manages the input/output equipments to determine whether they are connected through the network. When a desired input/output equipment is to be selected, whether the input/output equipments are connected through the network is explicitly indicated.

18 Claims, 21 Drawing Sheets

| TYPE INFORMATION | CONNECTION INFORMATION | | DEVICE NAME |
|---|---|---|---|
| | APPARATUS/LAN | INTERFACE | |
| SCANNER | APPARATUS | RS-232C | scanner 1 |
| SCANNER | APPARATUS | SCSI | scanner 2 |
| SCANNER | LAN | — | net scanner 1 |
| SCANNER | LAN | — | net scanner 2 |

U.S. PATENT DOCUMENTS

| | | | |
|---|---|---|---|
| 5,123,063 A | * 6/1992 | Ohkubo | 382/58 |
| 5,167,021 A | * 11/1992 | Needham | 710/306 |
| 5,274,781 A | 12/1993 | Gibart | |
| 5,430,525 A | 7/1995 | Ohta et al. | |
| 5,432,525 A | * 7/1995 | Maruo et al. | 345/2 |
| 5,438,675 A | 8/1995 | Fujioka | |
| 5,455,910 A | 10/1995 | Johnson et al. | |
| 5,465,156 A | * 11/1995 | Arai | 358/296 |
| 5,467,198 A | * 11/1995 | Aosaki et al. | 358/400 |
| 5,515,512 A | 5/1996 | Yamamoto | |
| 5,535,418 A | 7/1996 | Suzuki | |
| 5,564,109 A | 10/1996 | Synder et al. | |
| 5,579,486 A | 11/1996 | Oprescu et al. | |
| 5,655,148 A | 8/1997 | Richman et al. | |
| 5,659,794 A | 8/1997 | Caldarale et al. | |
| 5,717,950 A | 2/1998 | Yamaguchi et al. | |
| 5,911,044 A | 6/1999 | Lo et al. | 709/203 |
| 5,935,217 A | 8/1999 | Sakai et al. | 709/249 |

* cited by examiner

FIG. 6

DEVICE TABLE

| TYPE INFORMATION | CONNECTION INFORMATION | DEVICE NAME |
|---|---|---|
| SCANNER | APPARATUS | scanner 1 |
| SCANNER | NETWORK | net scanner 1 |
| SCANNER | NETWORK | net scanner 2 |
| FACSIMILE | APPARATUS | fax 1 |
| FACSIMILE | NETWORK | net fax 1 |
| FACSIMILE | NETWORK | net fax 2 |
| FACSIMILE | NETWORK | net fax 3 |
| ⋮ | ⋮ | ⋮ |

| TYPE | CONNECTION INFORMATION | | DEVICE NAME |
| INFORMATION | APPARATUS/LAN | INTERFACE | |
|---|---|---|---|
| SCANNER | APPARATUS | RS·232C | scanner 1 |
| SCANNER | APPARATUS | SCSI | scanner 2 |
| SCANNER | LAN | — | net scanner 1 |
| SCANNER | LAN | — | net scanner 2 |

FIG. 26

| DEVICE NAME | PHYSICAL POSITION | STATUS | DISCRIMINATION NAME |
|---|---|---|---|
| SCANNER 1102 | 3F-B | BUSY | scanner 3 |
| SCANNER 1103 | 1F-A | READY | scanner 1 |
| FACSIMILE 1104 | 3F-C | BUSY | fax 3 |
| FACSIMILE 1105 | 2F-C | READY | fax 2 |
| ⋮ | ⋮ | ⋮ | ⋮ |

NETWORK SYSTEM IN WHICH PLURALITY OF IMAGE PROCESSING APPARATUSES ARE CONNECTED

This application is a continuation of U.S. Ser. No. 09/334,380, filed on Jun. 16, 1999 now U.S. Pat. No. 6,493,757, which in turn is a division of U.S. Ser. No. 08/423,966 filed on Apr. 18, 1995, now U.S. Pat. No. 5,935,217, which are incorporated herein in their entirety.

BACKGROUND OF THE INVENTION

The present invention relates to a network system in which a plurality of image processing apparatuses are connected.

Conventionally, there is a system in which, in addition to image data input/output with respect to a scanner, a printer, and the like connected to a host computer through a signal cable, image data input/output with respect to an input/output device such as a scanner and a printer connected to the scanner, the printer, and the host computer through a communication line can be performed. In such a system, when a target input or output device is to be selected by an operator from a plurality of devices, a list of selectable devices is displayed on the display unit of the host computer. From the displayed list, the operator selects a desired input/output device used for input/output processing.

Normally, input/output devices such as a digital copying apparatus, input/output devices connected to a host computer through signal cables, and input/output devices connected to the host computer through a communication line require different input/output processing times. More specifically, the input/output devices connected through a communication line require a longer input/output processing time because data transmission on the communication line takes a long time.

The processing speed is influenced depending on different interfaces used for connection of the input/output devices. In a general network system, however, when a list of selectable devices is displayed, such differences between devices selectable for input/output processing are not displayed. For this reason, the operator cannot know from the displayed list whether a desired input/output device can be used without interposing a communication line or it is already connected to a communication line.

There is another system in which various devices connected to a host computer through a bus or a network can be used by remote control from the host computer. In such a system, as for selection of a device used by remote control from the host computer, the user designates a desired device, or a device uniquely defined by the host computer is selected.

In the above device selection methods, when the host computer automatically selects a device, the device selected by the host computer may be located at a position distant from that desired by the user. Even if the user selects a desired device, the physical position of each device is unknown, so a distant device may be inevitably selected. Selection of the distant device is not preferable for data transfer because it results an increase in traffic of the network.

SUMMARY OF THE INVENTION

It is an object of the present invention to provide a method of controlling a network system, which eliminates the above drawbacks.

It is another object of the present invention to provide a control method in which a display based on the setting position of each device is made in selection of a target device in a network system, thereby facilitating selection in consideration of the setting position of each device.

It is still another object of the present invention to provide a control method in which an appropriate device can be selected on the basis of the setting position of each device when a target device in a network system is to be automatically selected.

It is still another object of the present invention to provide a control method in which display is performed so as to allow discrimination between devices usable without interposing a network and those used through a network in selection of a target device, thereby efficiently performing processing.

It is still another object of the present invention to provide a control method in which display is performed so as to allow discrimination between the types of interfaces of devices in selection of a target device, thereby efficiently performing processing.

It is still another object of the present invention to provide a control method in which a device connected to a network can be reserved for use from a digital copying apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing a device table for storing information of input/output devices usable in the network system;

FIG. 26 is a view showing the data structure of the device table of the third embodiment.

DETAILED DESCRIPTION OF THE PREFERRED EMBODIMENTS

Preferred embodiments of the present invention will be described below with reference to the accompanying drawings.

[First Embodiment]

Figure 1:
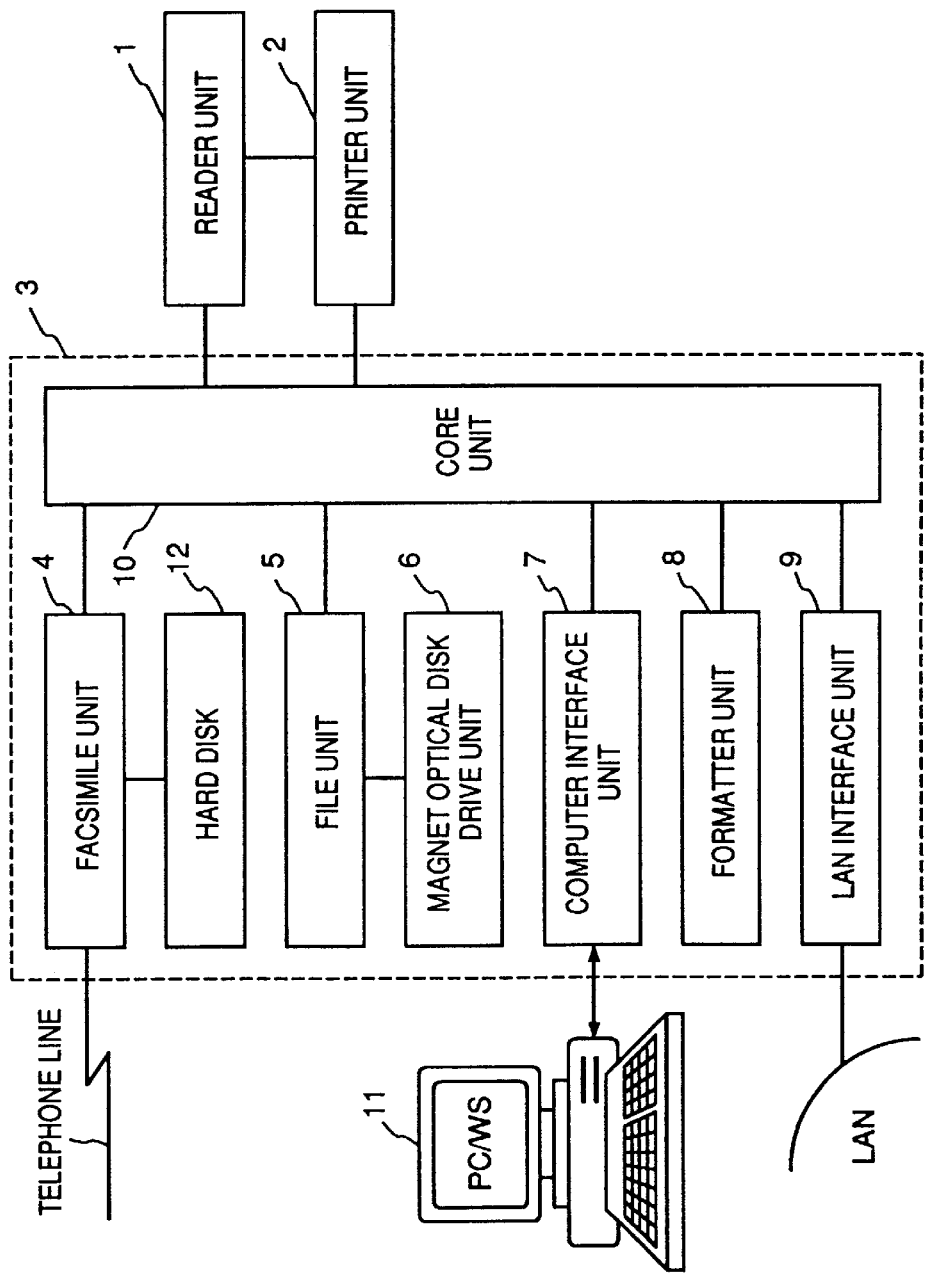
FIG. 1 is a block diagram of an image processing apparatus according to an embodiment of the present invention.

FIG. 1 is a block diagram showing the arrangement of an image processing apparatus according to an embodiment of the present invention. A reader unit 1 reads an original image and outputs image data corresponding to the original image to a printer unit 2 and an image input/output control unit 3. The printer unit 2 records an image corresponding to the image data from the reader unit 1 and the image input/output control unit 3 on a recording paper sheet. The image input/output control unit 3 is connected to the reader unit 1 and constituted by a facsimile unit 4, a file unit 5, a computer interface unit 7, a formatter unit 8, a LAN interface unit 9, a core unit 10, and the like.

The facsimile unit 4 expands compressed image data received through a telephone line and transfers the expanded image data to the core unit 10, or compresses image data transferred from the core unit 10 and transmits the compressed image data through the telephone line. A hard disk 12 is connected to the facsimile unit 4 to temporarily store the received compressed image data. A magnetooptical disk drive unit 6 is connected to the file unit 5. The file unit 5 compresses image data transferred from the core unit 10 and stores the image date in a magnetooptical disk set in the magnetooptical disk drive unit 6, together with a key word for searching the image data. The file unit 5 searches, on the basis of the key word transferred through the core unit 10, the compressed image data stored in the magnetooptical disk, reads and expands the searched compressed image data, and transfers the expanded image data to the core unit 10. The computer interface unit 7 serves as an interface between a personal computer or workstation (PC/WS) 11 and the core unit 10. The formatter unit 8 develops code data representing an image transferred from the PC/WS 11 into image data capable of being recorded by the printer unit 2. The LAN interface unit 9 is connected to a LAN (Local Area Network) and performs data communication through the LAN.

The core unit 10 (to be described later) controls a data flow through the reader unit 1, the facsimile unit 4, the file unit 5, the computer interface unit 7, the formatter unit 8, and the LAN interface unit 9.

Figure 2:
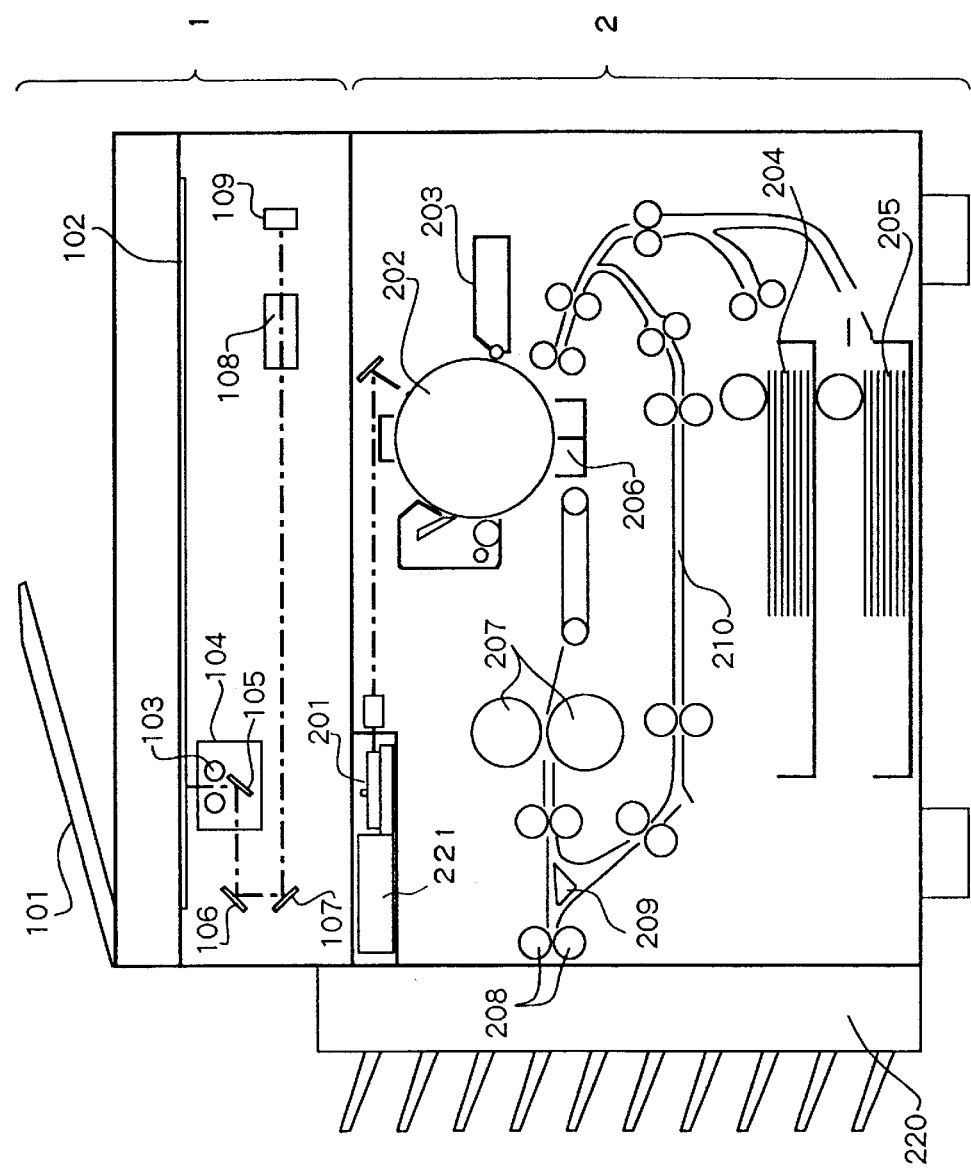
FIG. 2 is a sectional view of a reader unit and a printer unit.

FIG. 2 is a sectional view of the reader unit 2 and the printer unit 2. An original feeder unit 101 of the reader unit 1 sequentially feeds originals one by one from the last page onto a platen glass 102 and discharges the original on the platen glass 102 upon completion of the original reading operation. When an original is fed onto the platen grass 102, a lamp 103 is turned on, and a scanner unit 104 starts to move, thereby exposing and scanning the original. A light beam reflected by the original is guided to a CCD image sensor (to be referred to as a CCD hereinafter) 109 by mirrors 105 to 107 and a lens 108. Tn this manner, the scanned original image is read by the CCD 109. Image data output from the CCD 109 is subjected to predetermined processing and then transferred to the printer unit 2 and the core unit 10 of the image input/output control unit 3.

A laser driver 221 of the printer unit 2 drives a laser emitting unit 201 and causes the laser emitting unit 201 to emit a laser beam according to image data output from the reader unit 1. The laser beam is irradiated on a photosensitive drum 202. A latent image according to the laser beam is formed on the photosensitive drum 202. A developing agent is applied to the latent image portion of the photosensitive drum 202 by a developing unit 203. In synchronism with the start of laser beam irradiation, a recording paper sheet is fed from a cassette 204 or 205 and conveyed to a transfer unit 206. The developing agent on the photosensitive drum 202 is transferred to the recording paper sheet. The recording paper sheet with the developing agent is conveyed to a fixing unit 207, and the developing agent is fixed on the recording paper sheet by heat and pressure of the fixing unit 207. The recording paper sheet passing through the fixing unit 207 is discharged by discharge rollers 208. A sorter 220 stores discharged recording paper sheets on bins to sort the recording paper sheets. When a sort mode is not set, the sorter 220 stores recording paper sheets on the uppermost bin. When a perfection recording mode is set, the recording paper sheet is conveyed up to the discharge rollers 208. Thereafter, the rotating direction of the discharge rollers 208 is reversed to guide the paper sheet to a refeeder path by a flapper 209. When a multiple recording mode is set, the recording paper sheet is guided to the refeeder path by the flapper 209 so as not to be conveyed to the discharge rollers 208. The recording paper sheet guided to the refeeder path is fed to the transfer unit 206 at the above-described timing.

Figure 3:
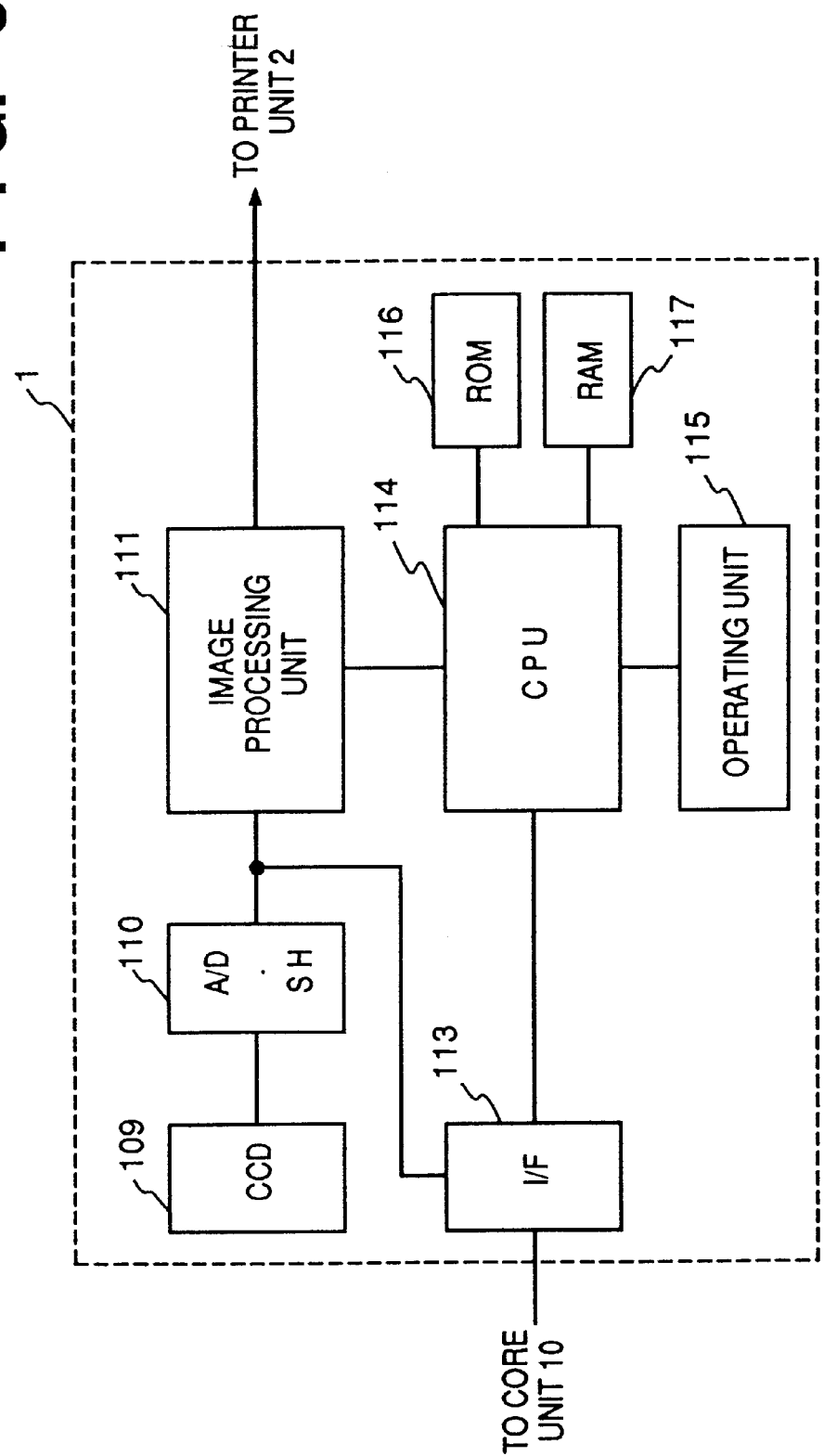
FIG. 3 is a block diagram of the reader unit.

FIG. 3 is a block diagram of the reader unit 1. Image data output from the CCD 109 is subjected to analog-to-digital conversion and shading correction by an A/D•SH unit 110. The image data processed by the A/D•SH unit 110 is transferred to the printer unit 2 through an image processing unit 111 and at the same time transferred to the core unit 10 of the image input/output control unit 3 through an interface unit 113. A CPU 114 controls the image processing unit 111 and the interface unit 113 in accordance with contents set at an operating unit 115. For example, when a copy mode for trimming and copying the image data is set at the operating unit 115, the image data is trimmed by the image processing unit 111 and transferred to the printer unit 2. When a facsimile transmission mode is set at the operating unit 115, image data and a control command according to the set mode are transferred from the interface unit 113 to the core unit 10. The control program of the CPU 114 is stored in a ROM 116, and the CPU 114 performs control with reference to the ROM 116. A RAM 117 is used as the work area of the CPU 114.

Figure 4:
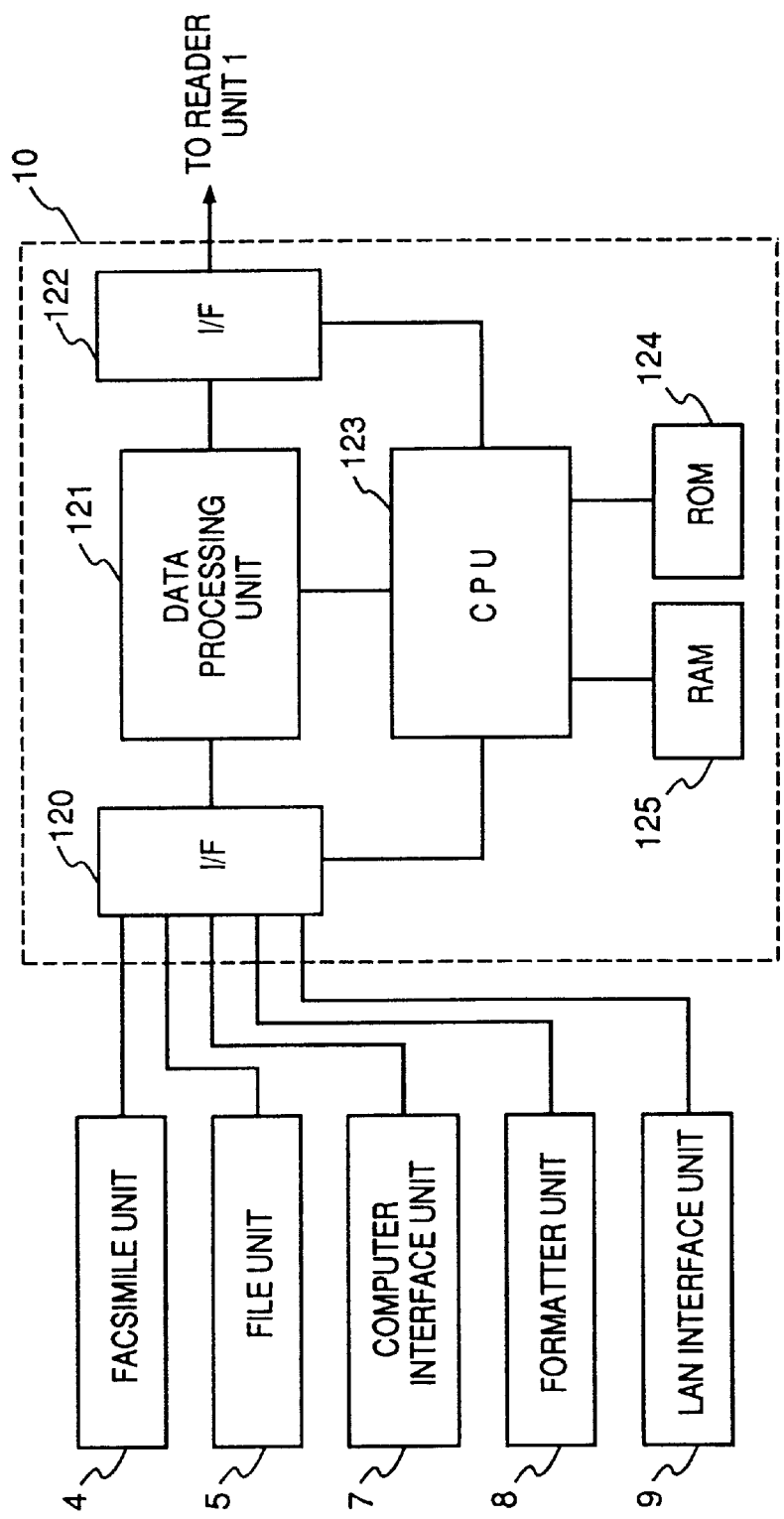
FIG. 4 is a block diagram of a core unit.

FIG. 4 is a block diagram of the core unit 10. Image data from the reader unit 1 is transferred to a data processing unit 121 while a control command from the reader unit 1 is transferred to a CPU 123. The data processing unit 121 performs image processing including rotation processing and scaling processing. The image data transferred from the reader unit 1 to the data processing unit 121 is transferred to the facsimile unit 4, the file unit 5, the computer interface unit 7, or the LAN interface unit 9 through an interface 120 in accordance with the control command transferred from the reader unit 1. Code data representing image data input through the computer interface unit 7 is transferred to the data processing unit 121. Thereafter, the code data is transferred to the formatter unit 8 and developed to image data. This image data is transferred to the data processing unit 121 and thereafter transferred to the facsimile unit 4, the printer unit 2, the file unit 5, or the LAN interface unit 9. Image data from the facsimile unit 4 is transferred to the data processing unit 121 and thereafter transferred to the printer unit 2, the file unit 5, the computer interface unit 7, or the LAN interface unit 9. Image data from the file unit 5 is transferred to the data processing unit 121 and thereafter transferred to the printer unit 2, the facsimile unit 4, the file unit 5, the computer interface unit 7, or the LAN interface unit 9. Image data input through the LAN interface unit 9 is transferred to the data processing unit 121 and thereafter transferred to the printer unit 2, the facsimile unit 4, the file unit 5, or the computer interface unit 7. Code data representing an image input through the LAN interface unit 9 is transferred to the data processing unit 121. Thereafter, the code data is transferred to the formatter unit 8 and developed to image data. This image data is transferred to the data processing unit 121 and thereafter transferred to the printer unit 2, the facsimile unit 4, the file unit 5, or the computer interface unit 7.

The CPU 123 performs control including data transfer destination switching in accordance with a control program stored in a ROM 124 and a control command transferred from the reader unit 1. A RAM 125 is used as the work area of the CPU 123. In this manner, composite processing with functions of original image reading, image printing, image transmission/reception, image storage, data input/output to/from a computer, and data input/output through a LAN can be processed by existence of the core unit 10.

The CPU 123 also performs communication with CPUs respectively provided to the reader unit 1, the facsimile unit 4, the file unit 5, the computer interface unit 7, the formatter unit 8, and the LAN interface unit 9, thereby performing data transfer control.

In the image processing system shown in FIG. 1, image information can be input from the reader unit 1, the facsimile unit 4, the file unit 5, the computer interface unit 7, or an image information input device on the LAN, which is connected through the LAN interface unit 9. In addition, input image information can be output to the printer unit 2, the facsimile unit 4, the file unit 5, the computer interface unit 7, or an image information input device on the LAN, which is connected through the LAN interface unit 9.

By using the formatter unit 8, a document file (file consisting of command data) input from the facsimile unit 4, the file unit 5, the computer interface unit 7, or an image information input device on the LAN, which is connected through the LAN interface unit 9, can be developed to image data, thereby obtaining image information. In addition, the obtained image information can be output to the printer unit 2, the facsimile unit 4, the file unit 5, the computer interface unit 7, or an image information input device on the LAN, which is connected through the LAN interface unit 9.

In the above cases, an input or output device is selected by the operator. For selection of an input or output device, the list of usable input or output devices is displayed on the display unit of the operating unit 115 of the reader unit 1. In the image processing system of this embodiment, information representing whether a device can be used without interposing a LAN (a device is included in the image processing apparatus shown in FIG. 1) or it is already connected through a LAN is simultaneously displayed in the list. Therefore, the operator can select an optimal input or output device with reference to this displayed information.

As an example of input device selection processing in a network system for image processing of this embodiment, a case will be described below in which an original image input from an optical scanner device is copied (i.e., output from the printer unit 2).

Figure 5:
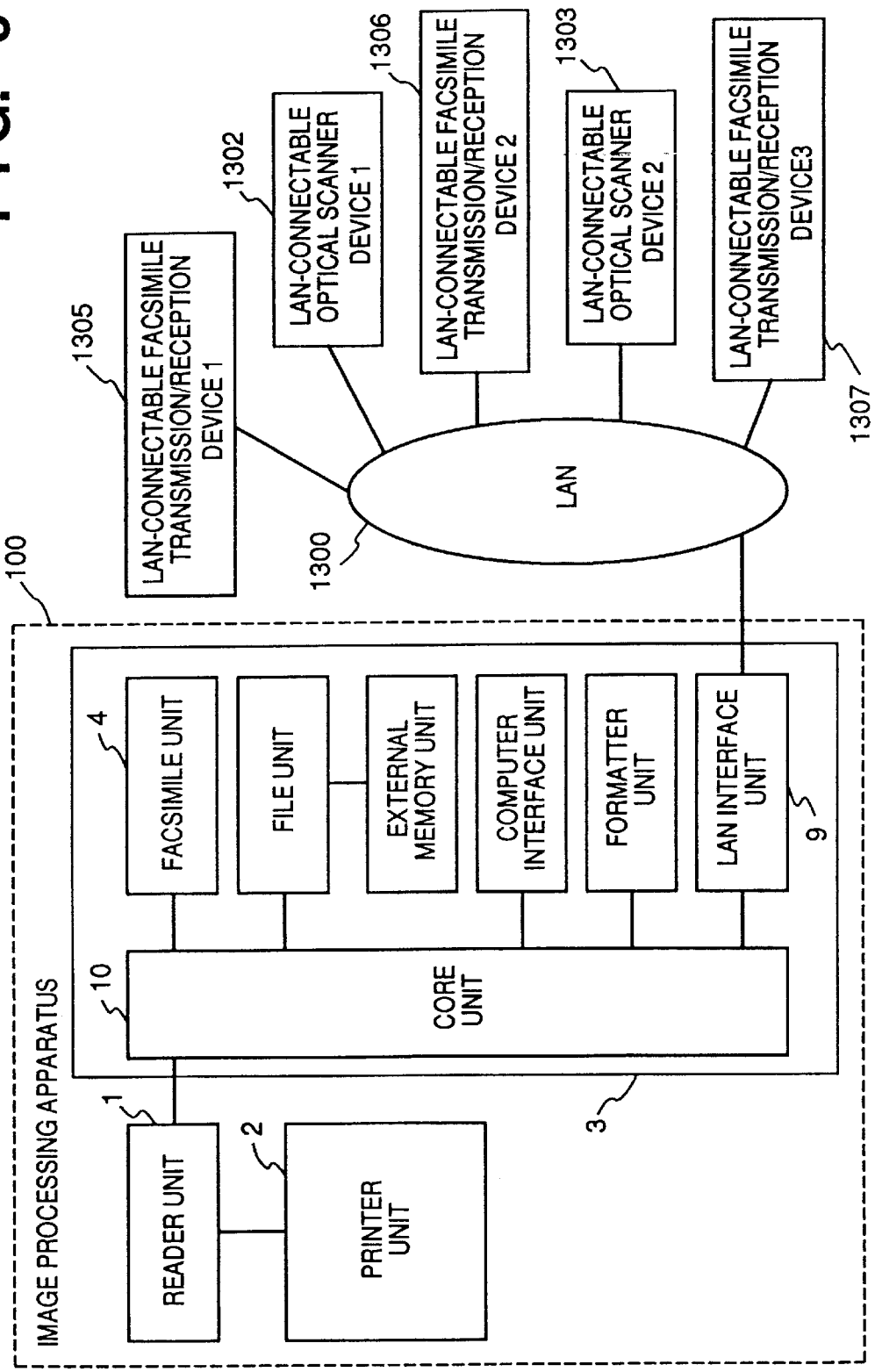
FIG. 5 is a block diagram showing an arrangement of a network system of the first embodiment.

FIG. 5 is a block diagram showing the arrangement of the network system of this embodiment. An image processing apparatus 100 has the reader unit 1, the printer unit 2, and the image input/output control unit 3, as described above. A LAN 1300 is connected to the LAN interface unit 9. Various input and output devices can be connected to the LAN 1300. In this embodiment, two optical scanner devices 1302 and 1303 and three facsimile transmission/reception devices 1305 to 1307 are connected to the LAN 1300.

In this network system, the CPU 123 of the core unit 10 periodically inquires each device connected to the LAN 1300 of its input/output attribute. The input/output attribute means each type of device (e.g., a facsimile device, a scanner, and a printer). As a result of inquiry, a table as shown in FIG. 6 is formed in the RAM 125.

FIG. 6 is a view showing a device table for storing information of input and output devices usable in the network system. The device table includes type information representing the types of devices and connection information representing whether the devices are included in the image processing apparatus 1100 or they are connected through the LAN.

An image input/output operation in this network system will be described below.

Figure 7:
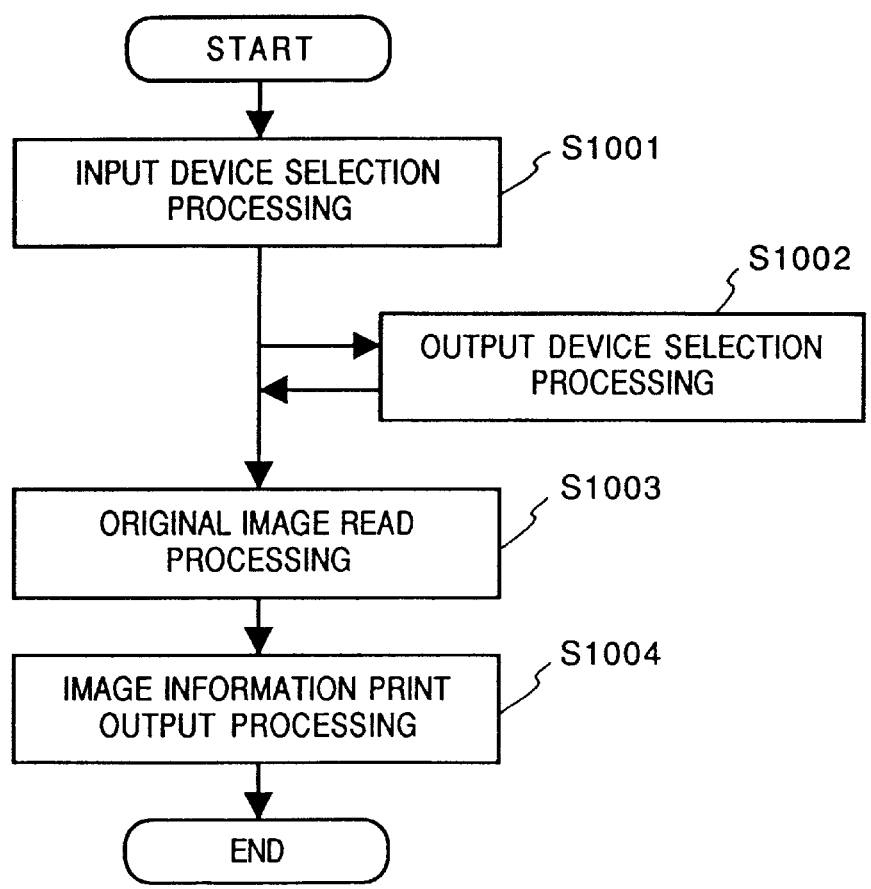
FIG. 7 is a flow chart showing image input procedures of the first embodiment.

FIG. 7 is a flow chart showing the image input procedures of this embodiment. In step S1001, an input device for reading an original image to be copied is selected. In this example, one of the optical scanner devices is selected as a target input device. The reader unit 1 is included in the image processing apparatus 100 as an optical scanner device, and it can be used to input the original image. In addition to the optical scanner device included in the image processing apparatus 100, the optical scanner device 1302 and 1303 (to be referred to as a virtual optical scanner device hereinafter) connected through the LAN interface unit 9 and the LAN 1300 can also be selected to input the original image.

Figure 8:
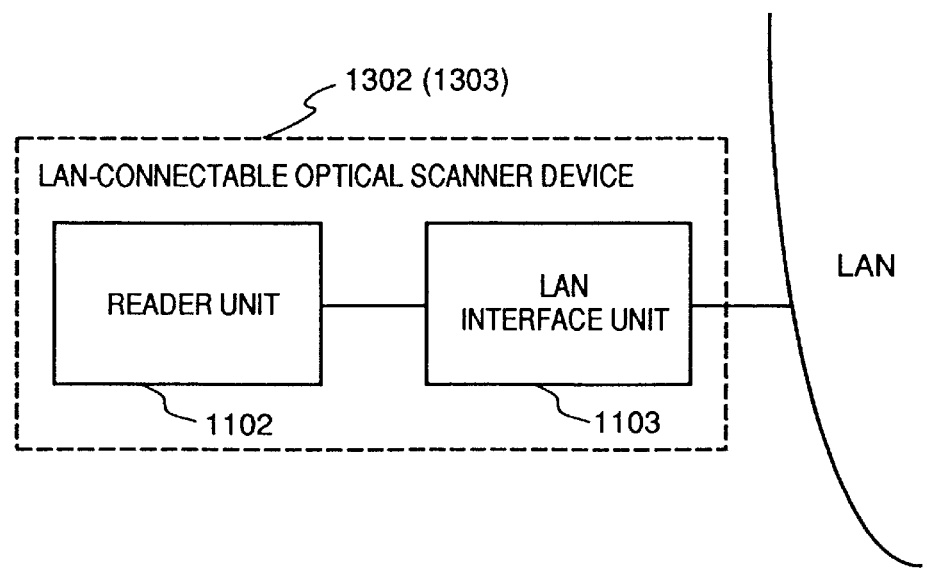
FIG. 8 is a block diagram schematically showing the arrangement of a LAN-connectable optical scanner device of the first embodiment.

The virtual optical scanner device in this embodiment means a LAN-connectable optical scanner device, and is connected to the LAN 1300. As shown in the block diagram of FIG. 8, the LAN-connectable optical scanner device 1302 is constituted by an image input unit (reader unit 1102) for converting an original image into image data and a LAN interface unit 1103 for transmitting the read image data to another device connected on the LAN 1300. The reader unit 1102 and the LAN Interface unit 1103 have the same functions as those of the reader unit 1 and the LAN interface unit 9, which are included in the image processing apparatus 100 of this embodiment.

The procedures of input device selection processing in step S1001 will be described below with reference to FIGS. 9 to 11.

Figure 9:
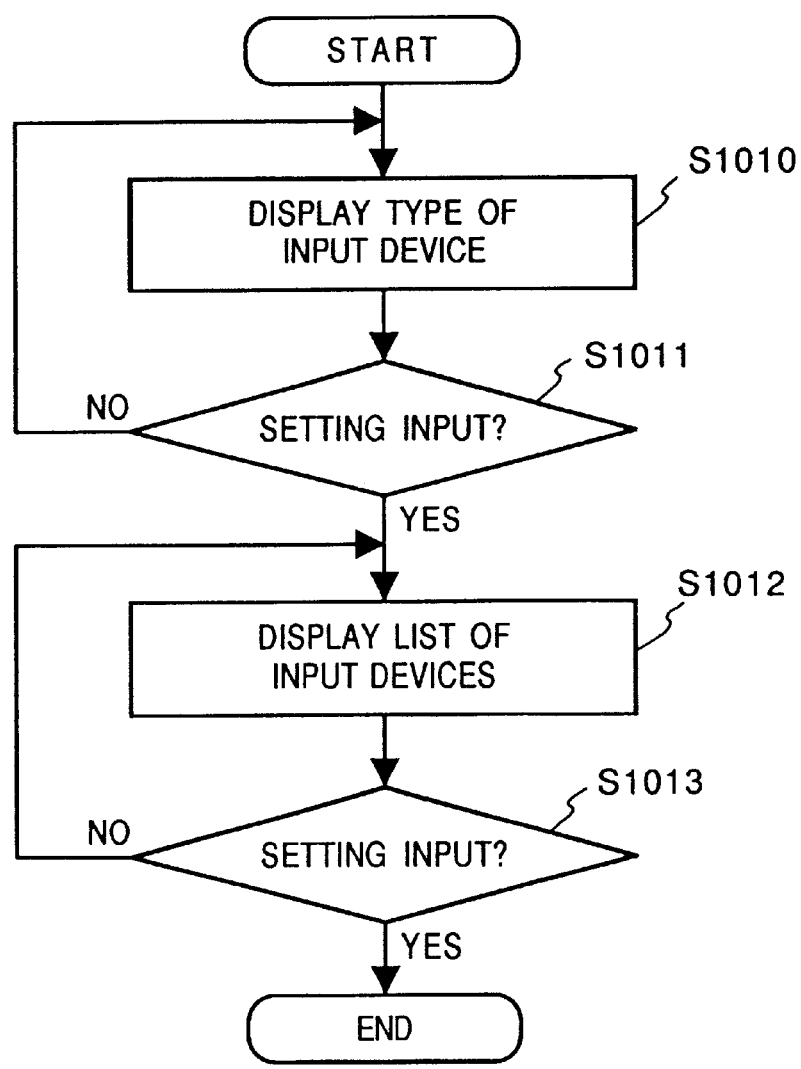
FIG. 9 is a flow chart showing the procedures of input device selection processing in detail.

FIG. 9 is a flow chart showing the procedures of input device selection processing (step S1001) in detail. In step S1010, the types of input devices are displayed on the liquid crystal display unit of the operating unit 115 on the basis of the device table in the RAM 125.

Figure 10:
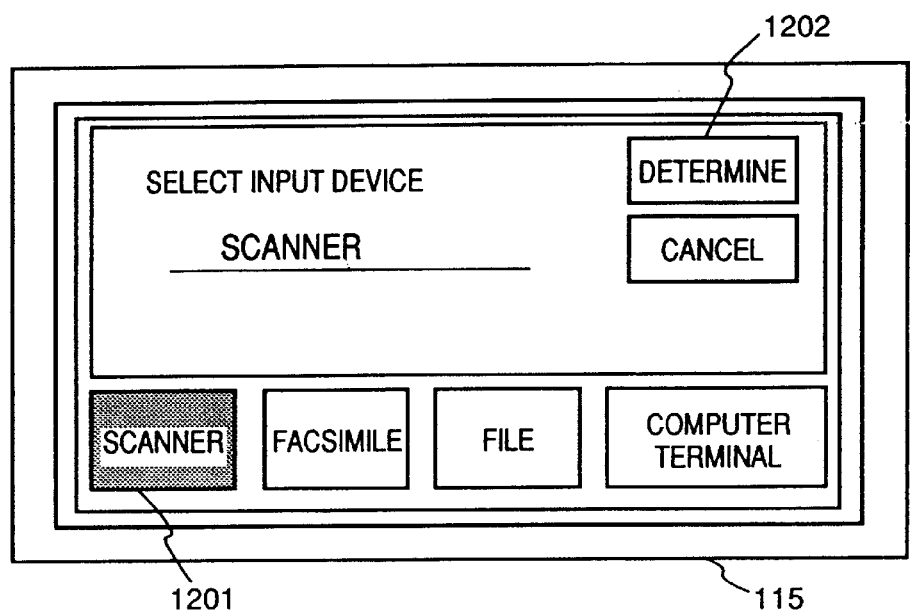
FIG. 10 is a view showing the display state of the types of input devices.
Figure 11:
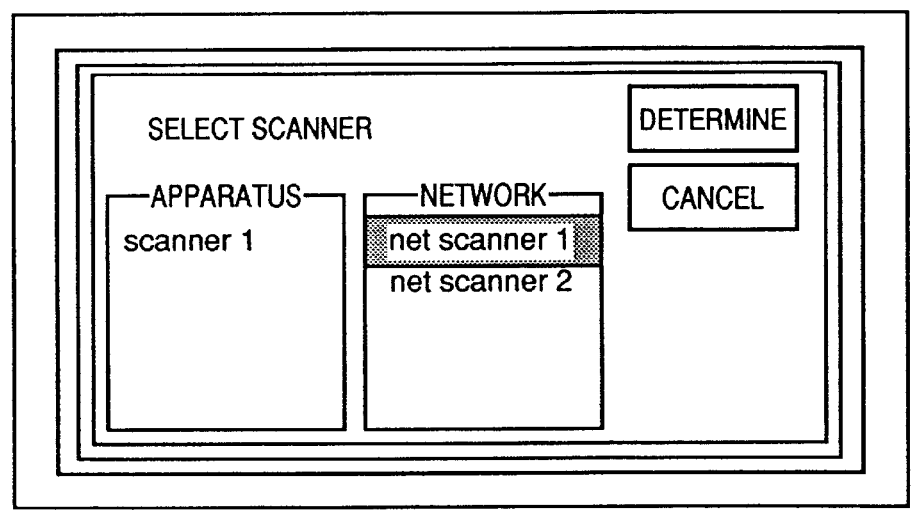
FIG. 11 is a view showing a display screen for selecting a scanner used as an input device.

FIG. 10 is a view showing the display state of the types of input devices. The liquid crystal display unit is constituted by, e.g., a touch panel, and when the operator touches an operation key drawn on the liquid crystal display unit, an input operation is performed. When a scanner is to be selected as a type of input device, the display changes upon touching a scanner key 1201 to display in a display area 1203 that a scanner is selected. By touching a determination key 1202 in this state, the use of a scanner as a type of input device is determined. When the type of input device is determined in this manner, the flow advances from step S1011 to step S1012.

In the above manner, the operator determines the type of input device in accordance with the display screen displayed on the liquid crystal display unit of the operating unit 115 (in this example, a scanner is selected as the type of an input device). In step S1012, the list of input devices belonging to the selected type is displayed on the liquid crystal display unit. As in this example, when the image processing apparatus 100 is connected to the LAN 1300 through the LAN interface unit 9, and other optical scanner devices are connected on the LAN 1300, the operator can select a virtual optical scanner device as an input device in addition to the optical scanner device included in the image processing apparatus 100. More specifically, when the image processing apparatus is in a LAN environment as shown in FIG. 5, the optical scanner device (reader unit 1) and the virtual optical scanner devices (optical scanner devices 1302 and 1303) can be selected as an input device.

This selection processing is performed in accordance with a display screen displayed on the liquid crystal display unit of the operating unit 115 such that the operator selects one of the optical scanner devices. FIG. 11 is a view showing a display screen for selecting a scanner used as an input device. As shown in FIG. 11, available optical scanner devices are displayed so as to allow discrimination between those included in the image processing apparatus 100 and those connected through the LAN with reference to the device table in the RAM 125 shown in FIG. 6. Therefore, the operator can discriminate input devices included in the image processing apparatus 100 from those connected through the LAN, thereby more effectively selecting an optical scanner device used as an input device. In this manner, the selected input device is reserved. The input device selection processing is ended (step S1013), and the flow advances to step S1002 (FIG. 7).

In step S1002, the operator can select any image printing device as an output device for copying the original image. Output device selection processing in step S1002 will be described later in detail. The image processing apparatus includes the printer unit 2 as an image printing device. If output device selection processing is not performed in step S1002, the printer unit 2 is unconditionally selected as an image printing device.

In step S1003, original image read processing is performed. If the original image is to be read by the reader unit 1 in the image processing apparatus 100, the image read by the reader unit 1 is sent to the printer unit 2 or the core unit 10.

When an original image is to be input by the virtual optical scanner device connected through the LAN interface unit 9, the LAN-connectable scanner selected by the operator in step S1001 is used to execute original image read processing. Original image read processing in the reader unit 1102 of the LAN-connectable scanner 1101 is the same as in the reader unit 1.

The image information read by the LAN-connectable scanner 1101 is transmitted to the image processing apparatus 100 through the LAN interface unit 1103 and the LAN 1300. The basic operation related to LAN transmission of the image information in the LAN interface unit 1103 is the same as in the LAN interface unit 9. On the other hand, in the image processing apparatus 100, the LAN interface unit 9 receives the image information transmitted through the LAN and sends the image information to the core unit 10.

In step S1004, image information print output processing is performed. As an image information print output device, the printer unit 2 is selected if no output device is selected by the operator. When an image read by the reader unit 1 is to be printed by the printer unit 2, the image information is directly sent from the reader unit 1 to the printer unit 2.

As an example of output device selection processing in the image processing, apparatus 100, a case will be described below with reference to FIGS. 12 to 15, in which an original image input from the optical scanner device is transmitted to a facsimile device.

Figure 12:
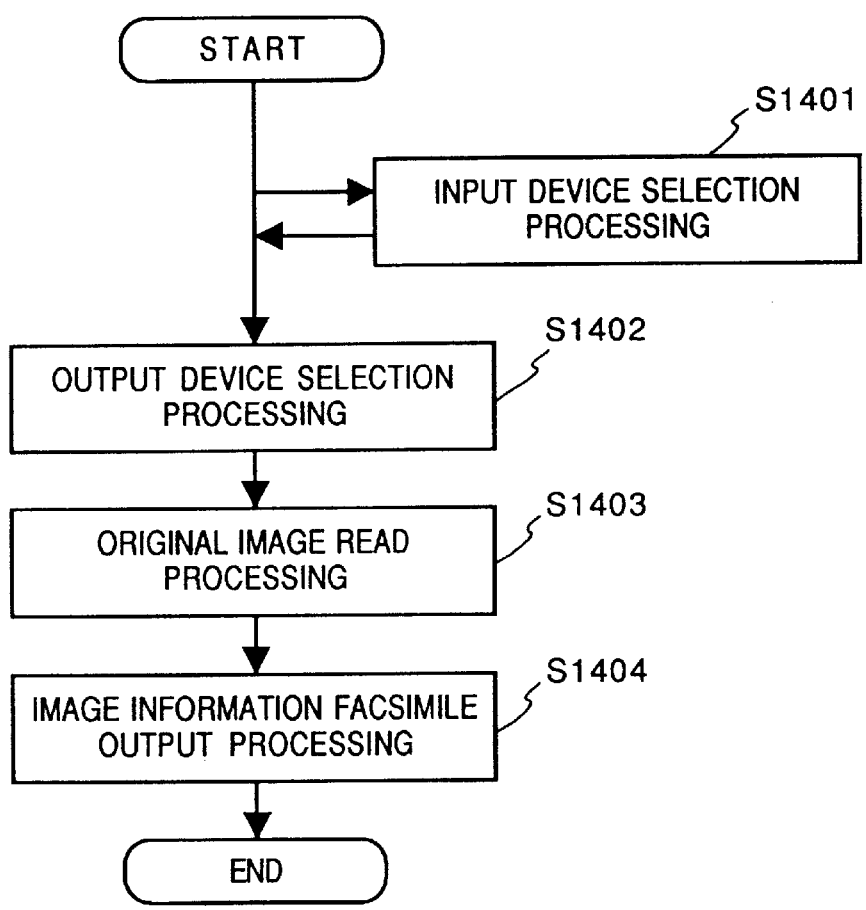
FIG. 12 is a flow chart for explaining the image output procedures of the first embodiment.

FIG. 12 is a flow chart for explaining the procedures of image output processing of this embodiment. In step S1401, the operator can select an input device as the occasion demands. More specifically, as an input device for reading an original image to be transmitted, an optical scanner device included in the image processing apparatus 100 or one of various image input devices connected through the network can be selected. Input device selection processing in step S1401 is the same as in the flow chart of FIG. 9. If the input device selection processing (step S1401) is not performed, the reader unit 1 is unconditionally selected as an image input device.

In step S1402, one of facsimile transmission/reception devices is selected as an output device for performing facsimile transmission of the original image. The facsimile unit 4 is included in the image processing apparatus 100 as a facsimile transmission/reception device and can be used to perform facsimile transmission of image information. However, in addition to the facsimile unit 4 included in the image processing apparatus 100, a facsimile transmission/reception device (to be referred to as a virtual facsimile transmission/reception device hereinafter) connected through the LAN interface unit 9 can also be selected to perform facsimile transmission of image information. The virtual facsimile transmission/reception device in this embodiment means the LAN-connectable facsimile transmission/reception device connected on the LAN 1300.

Figure 13:
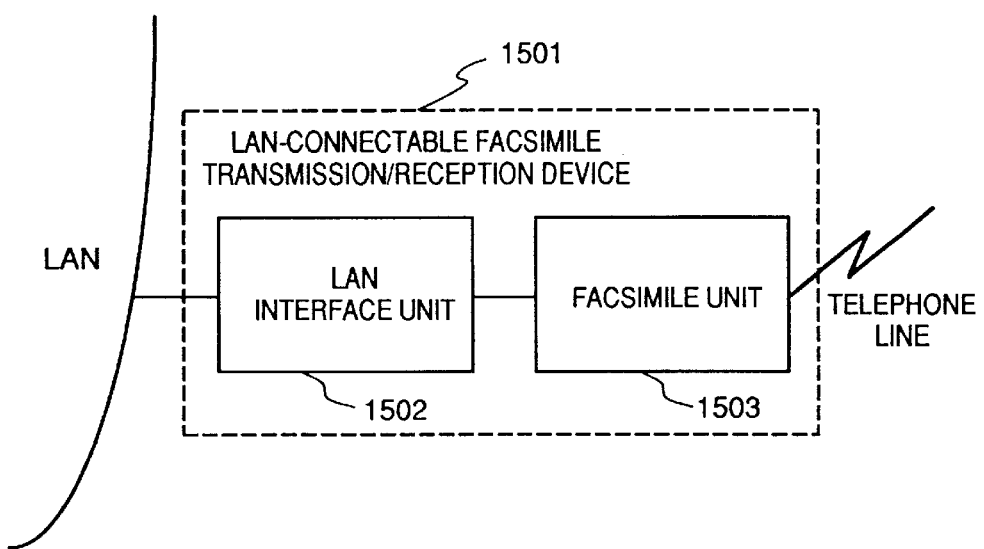
FIG. 13 is a block diagram schematically showing the arrangement of a LAN-connectable facsimile transmission/reception device of the first embodiment.

As shown in the block diagram of FIG. 13, a LAN-connectable facsimile transmission/reception device 1501 is constituted by a LAN interface unit 1502 for transmitting/receiving image information to/from another device through the LAN and a facsimile unit 1503 for performing facsimile transmission/reception through a telephone line. The LAN interface unit 1502 and the facsimile unit 1503 have the same functions as those of the LAN interface unit 9 and the facsimile unit 4 included in the image processing apparatus 100.

Figure 14:
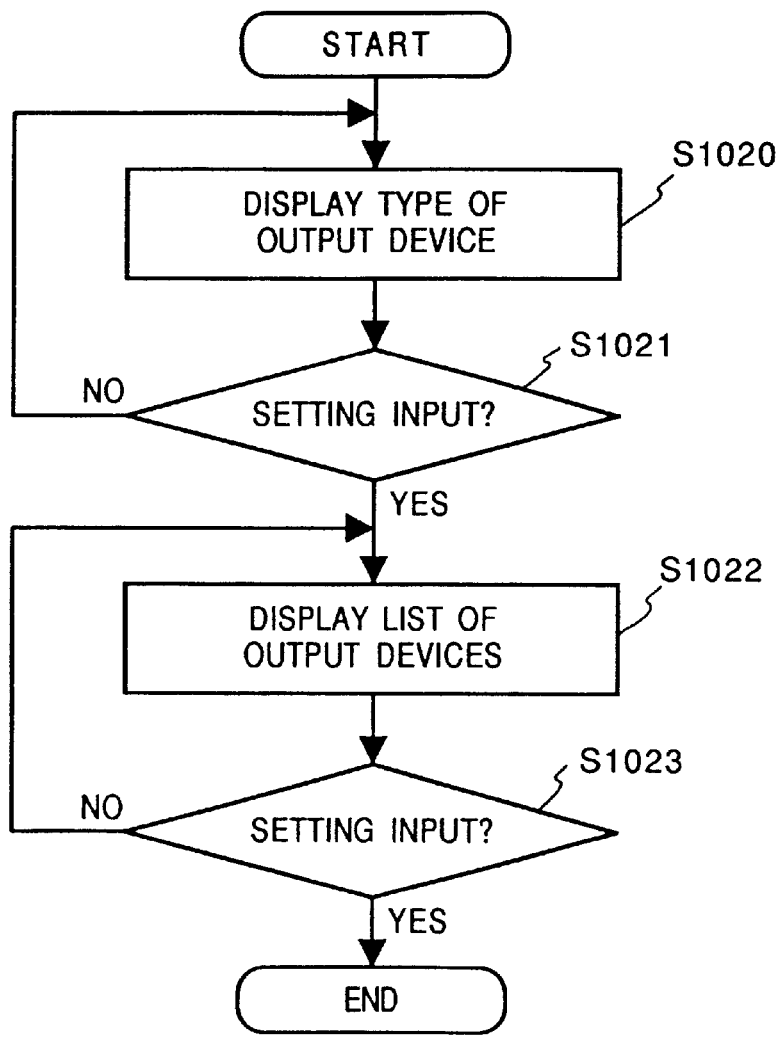
FIG. 14 is a flow chart showing the procedures of output device selection processing.
Figure 15:
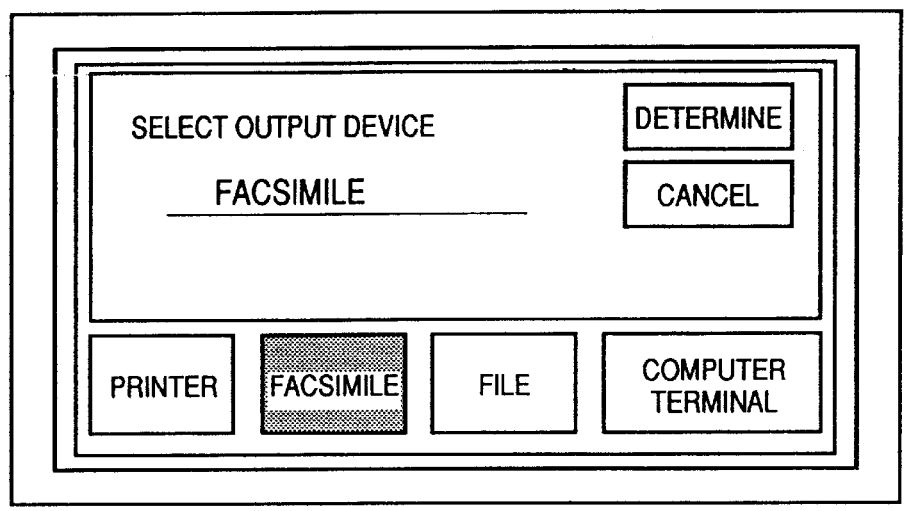
FIG. 15 is a view showing the display state of the types of output devices.

FIG. 14 is a flow chart showing the procedures of output device selection processing (step S1402). In step S1020, a screen shown in FIG. 15 is displayed on the liquid crystal display unit of the operating unit 115. The operator selects a desired output device from a plurality of types of output devices. In this example, a facsimile device is selected. With the same procedures as those in input device selection processing (FIG. 10), the operator sets a type of output device. The flow advances from step S1021 to step S1022.

Figure 16:
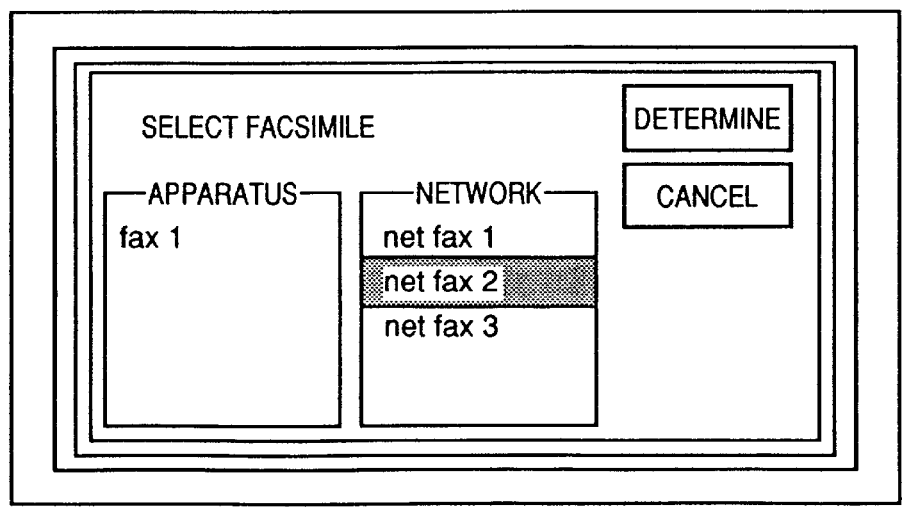
FIG. 16 is a view showing a display screen for selecting a facsimile device used as an output device.

In step S1022, the list of usable output devices belonging to the set type is displayed. FIG. 16 is a view showing the display state of the list of the usable output devices when a facsimile device is selected as a type of output device. As shown in FIG. 5, the image processing apparatus 10 is connected to the LAN through the LAN interface unit 9, and other facsimile transmission/reception devices are connected on the LAN. That is, the operator can select, as an output device, the virtual facsimile transmission/reception device other than the facsimile transmission/reception device included in the image processing apparatus 100. When the image processing apparatus 100 is in a LAN environment as shown in FIG. 5, the facsimile unit 4 and the virtual facsimile transmission/reception devices 1305 to 1307 can be selected as an output device.

A screen as shown in FIG. 16 is displayed on the liquid crystal display unit of the operating unit 115. Output device selection processing is performed such that the operator selects one facsimile transmission/reception device in accordance with this display screen. At this time, as shown in FIG. 16, facsimile transmission/reception devices which can be selected are displayed so as to allow discrimination between those included in the image processing apparatus 100 and those connected through the LAN. Therefore, the operator can more effectively select a facsimile transmission/reception device used for output processing in consideration of the above information.

In this manner, output device selection processing is performed, and processing in FIG. 14 is ended (step S1023). The flow advances to step S1403 in FIG. 12.

In step S1403, original image read processing is performed. As an image information input device, the reader unit 1 is selected if no input device is selected by the operator. An image read by the reader unit 1 is sent to the core unit 10.

In step S1404, image information input to the core unit 10 is transferred to the facsimile unit 4.

When facsimile transmission is to be performed by a virtual facsimile transmission/reception device connected through the LAN interface unit 9, a LAN-connectable facsimile transmission/reception device which is selected by the operator in step S1402 and connected to the LAN 1300 is used to execute facsimile transmission of the image. In the LAN-connectable facsimile transmission/reception device 1501, image information transmitted from the LAN interface unit 9 through the LAN is received by the LAN interface unit 1502 included in the LAN-connectable facsimile transmission/reception device 1501. The image information received by the LAN interface unit 1502 is transmitted to a facsimile device through a telephone line connected to the facsimile unit 1503.

The basic operation related to reception of LAN-transmitted image information in the LAN interface unit 1502 included in the LAN-connectable facsimile transmission/reception device 1501 is the same as in the LAN interface unit 9. The basic operation related to facsimile transmission of image information from the facsimile unit 1503 included in the LAN-connectable facsimile transmission/reception unit 1501 is the same as in the facsimile unit 4.

In the above embodiment, the communication line connected to the virtual devices is a LAN (Local Area Network). As the communication line, any generally known communication line such as a WAN (Wide Area Network) may also be used. As devices connected to the communication line, any device may be used as far as it can be connected to the generally known communication line.

In this embodiment, when there are a plurality of input devices including virtual devices connected on the LAN, the devices are classified into two types and displayed so as to allow discrimination between the types, i.e., devices included in the image processing apparatus 100 and those virtually usable through the LAN. As the display form, any display form may be adopted as far as it allows discrimination between the two types of input devices, as a matter of course.

Similarly, in this embodiment, when there are a plurality of output devices including virtual devices connected on the LAN, the devices are classified into two types and displayed so as to allow discrimination between the types, i.e., devices included in the image processing apparatus 100 and those virtually usable through the LAN. As the display form, any display form may be adopted as far as it allows discrimination between the two types of output devices, as a matter of course.

In the flow chart of FIG. 7, processing for copying an original image input from an optical scanner device has been described. However, the input device need not always be an optical scanner device. A device capable of inputting image information, i.e., a facsimile transmission/reception device, a magnetooptical memory device connected to the file unit 5, or a computer terminal through an interface may also be used. In this case, the display screen on the liquid crystal display unit or the designation procedures of the operator are the same as those described above.

In the flow chart of FIG. 12, facsimile transmission of an original image input from an optical scanner device has been described in detail. However, the output device need not always be a facsimile transmission/reception device. A device capable of outputting image information, i.e., a facsimile transmission/reception device, a magnetooptical memory device connected to the file unit 5, or a computer terminal through an interface may also be used. In this case, the display screen on the liquid crystal display unit or the designation procedures of the operator are the same as those described above.

In the above embodiment, to prepare the device table in FIG. 6, an inquiry to each device on the LAN is periodically performed. However, the present invention is not limited to this. For example, an inquiry may be executed when a type of input/output device is selected.

As described above, according to the first embodiment, input/output devices included in the image processing apparatus 10 and those connected through the LAN can be discriminated and displayed in selection of a target input/output device. Generally, the processing speed of an input/output device connected through a LAN becomes lower than that of an input/output device incorporated in the apparatus main body because of communication processing in a network. According to the first embodiment, the operator can select an input/output device in consideration of the processing speed, thereby efficiently performing processing.

[Second Embodiment]

In the first embodiment, input/output devices included in the image processing apparatus 100 and those connected through the LAN are displayed so as to allow discrimination therebetween, thereby allowing selection of an input/output device according to a required processing speed. In some recent LANs, however, high-speed communication can be performed. For example, in some cases, image data fetch processing through a LAN may be performed at a higher speed than image data fetch processing through RS232C communication of the computer interface unit 7. In the second embodiment, a network system will be described in which, in addition to various conditions, the difference in processing speed can be properly notified to the operator.

Figures 17, 18:
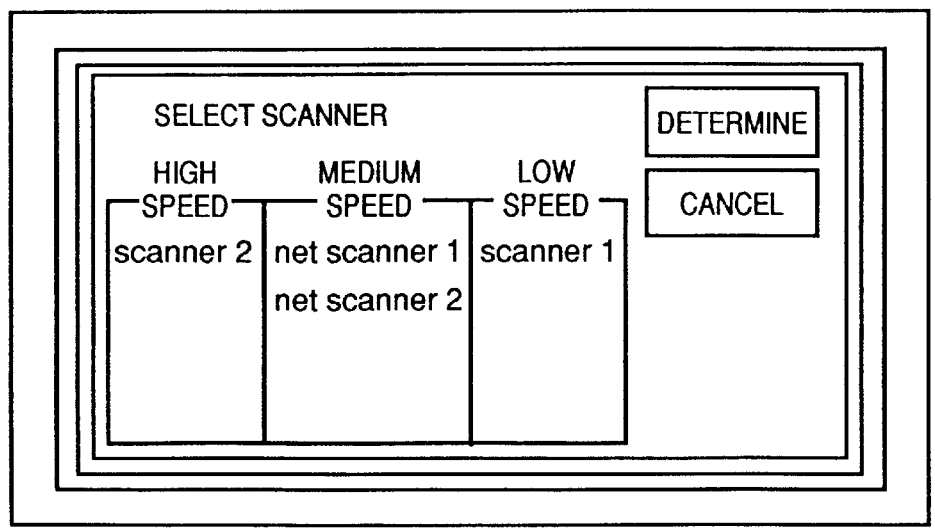
FIG. 17 is a view showing a device table of the second embodiment.
FIG. 18 is a view showing a display screen for selecting an input device according to the second embodiment.

FIG. 17 is a view showing a device table of the second embodiment. As for a timing for attribute information inquiry to each input/output device on the LAN, it may be periodically performed, or it may be performed when a type of input/output device is selected.

In the device table of the second embodiment, in addition to discrimination between input/output devices included in an image processing apparatus 100 and those connected through the LAN, data representing the types of interfaces is registered for input/output devices included in the image processing apparatus 100.

FIG. 18 is a view showing a display screen in input device selection processing. This display screen is displayed in place of the display state in above step S1012 in FIG. 9. As shown in FIG. 18, usable optical scanners are displayed so as to allow discrimination between processing speeds (high, medium, and low). The high speed, medium speed, and low speed are discriminated from each other on the basis of the types of interfaces. For example, display is made upon determining that the speed is low for an RS232C interface, high for a SCSI interface, and medium in connection through a LAN. Input/output devices other than the above scanners can also be displayed with a similar classification.

As described above, according to the image processing apparatus of the second embodiment, input/output devices are classified on the basis of processing speeds of interfaces and displayed in selection of an input/output device. Therefore, the operator can select an input/output device in consideration of the communication speed.

The present invention may be applied to a system constituted by a plurality of equipments or an apparatus constituted by one equipment. The present invention can also be applied when it is achieved by supplying a program for executing processing defined by the present invention to the system or apparatus, as a matter of course.

[Third Embodiment]

To select an input or output device while a host computer 11 (to be referred to as a computer hereinafter) is used to execute control for transferring an image from a desired input device on a LAN to a desired output device, the operator arbitrarily sets an input or output device (manual mode), or an image processing apparatus 100 (or the computer 11) automatically selects an input or output device (automatic mode). Device information including status information and physical position information (setting position information) is sent from each input/output device, and the devices are displayed on the basis of the device information in selection of an input/output device. With this processing, the operator can select an input/output device optimal for processing with reference to this displayed information. Therefore, a convenient input/output device can be selected as compared to automatic selection by the computer 11.

As an example of input/output device selection processing in a network system, a case will be described below in detail in which an original image input from an optical scanner device is transmitted to a facsimile device.

Figure 19:
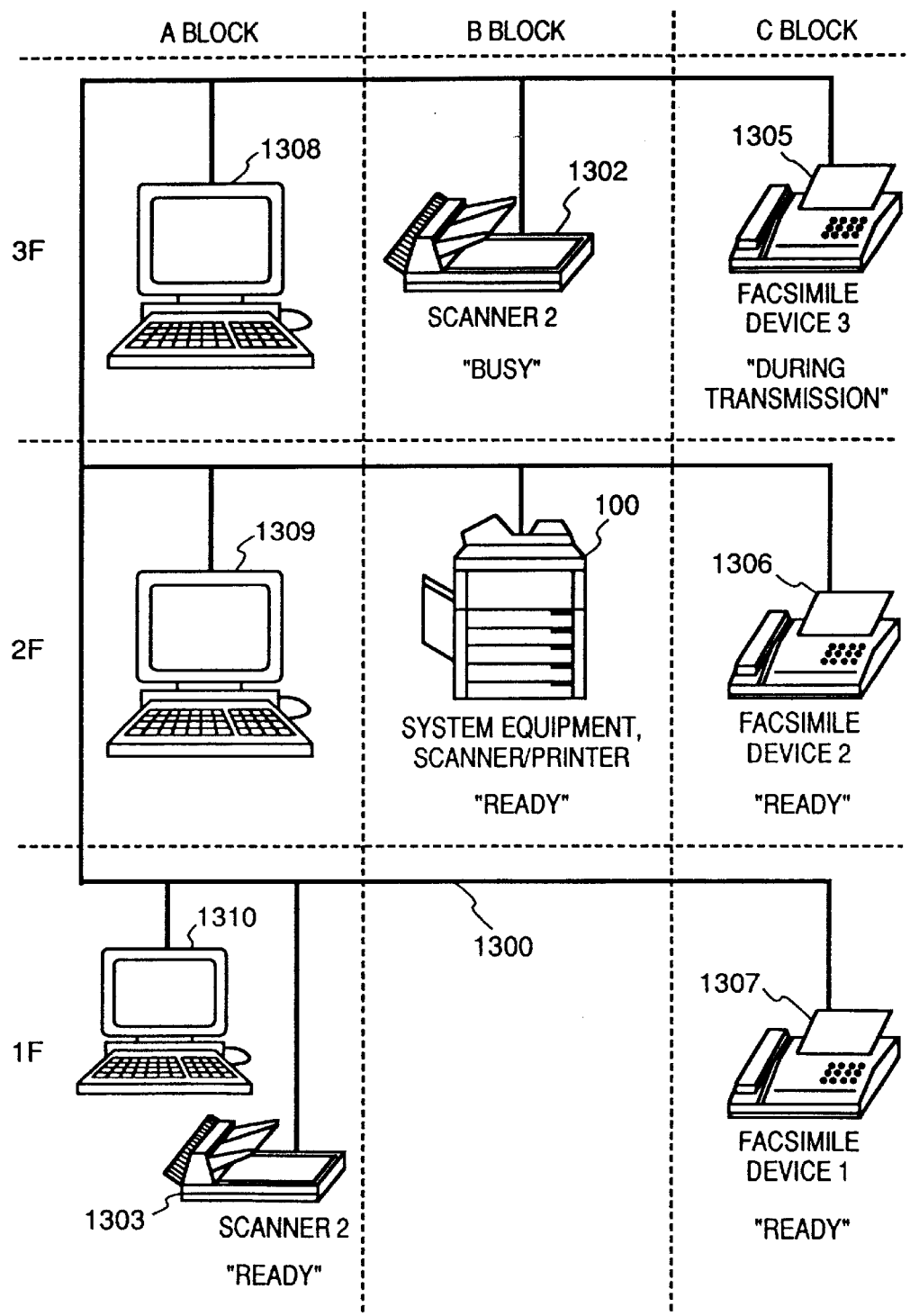
FIG. 19 is a view showing the setting position of each equipment in a network environment of the third embodiment.

FIG. 19 is a view showing the setting positions of devices in the network environment of this embodiment. The devices are set on the first floor (1F), the second floor (2F), and the third floor (3F) in a building and connected to a LAN 1300.

Information processing apparatuses 1308 to 1310 are connected to a LAN 1300, which can control each device through the LAN 1300 and input/output image data. As the information processing apparatuses 1308 to 1310, a personal computer or the like can be used.

Figure 20:
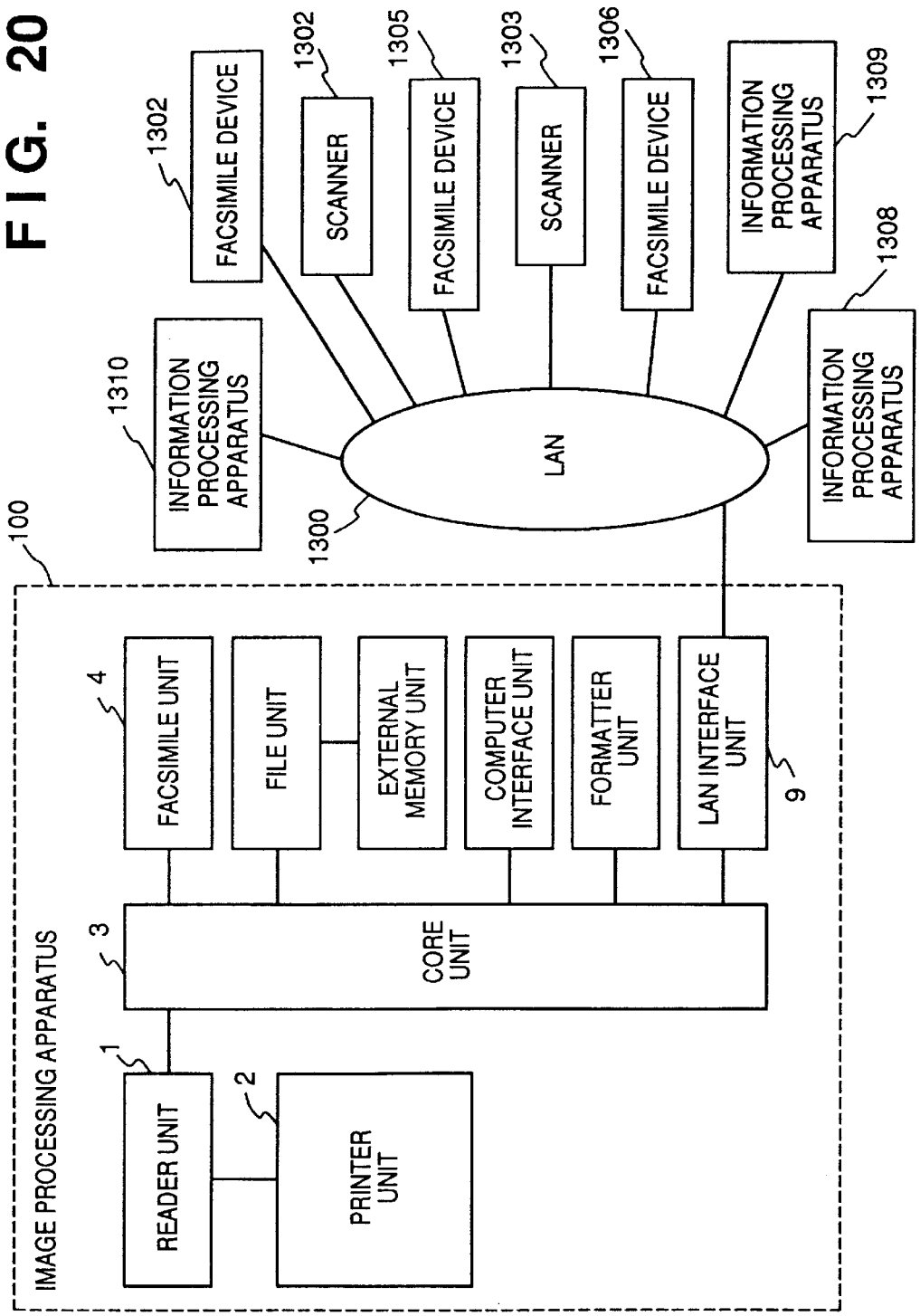
FIG. 20 is a block diagram showing the network environment of the third embodiment.

FIG. 20 is a block diagram showing the network environment of this embodiment.

The procedures of data input/output processing according to this embodiment will be described below by exemplifying a case in which, in this environment, the information processing apparatus 1310 on the first floor outputs a command for original image input processing or facsimile transmission output processing.

Figure 21:
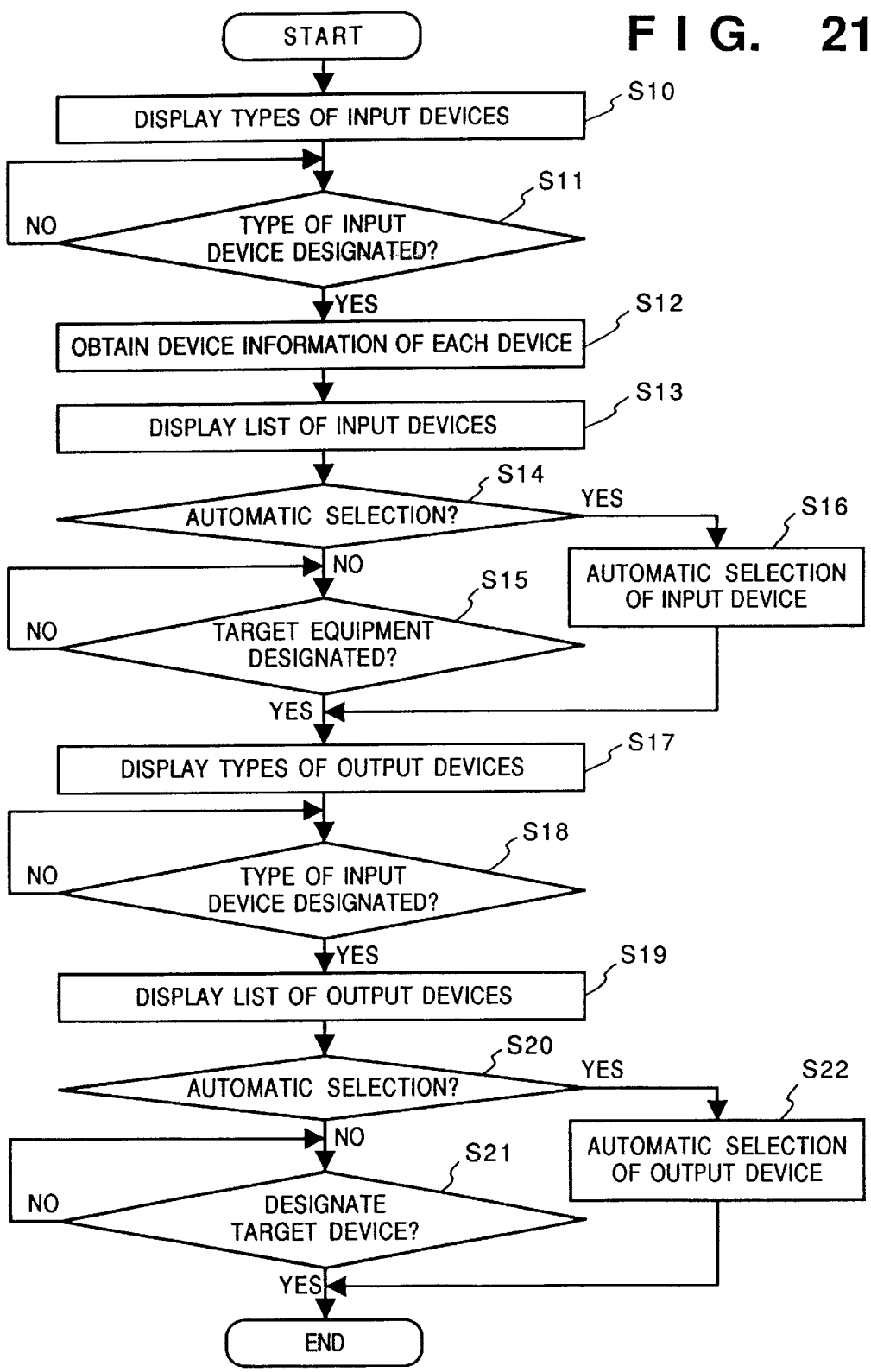
FIG. 21 is a flow chart for explaining the image data input/output procedures of the third embodiment.
Figure 22:
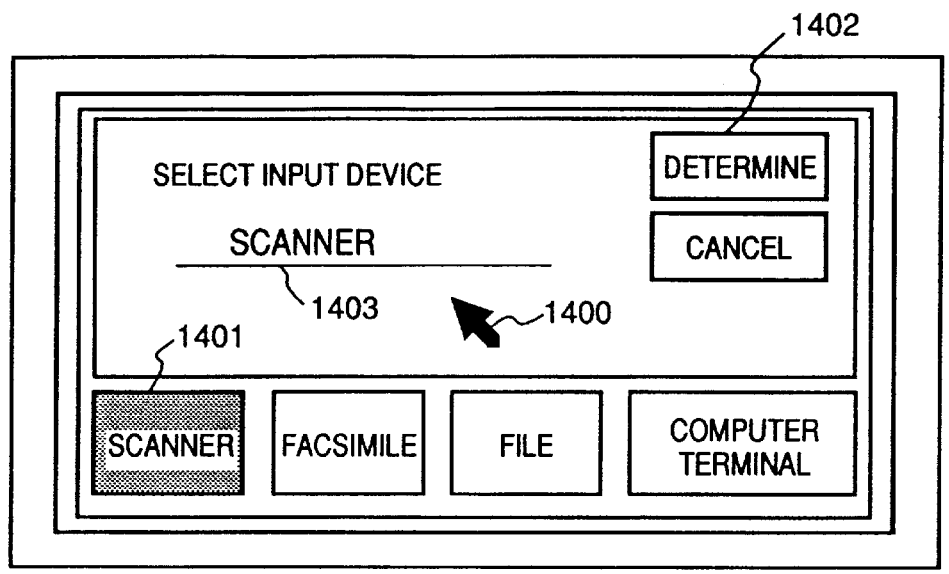
FIG. 22 is a view showing a display screen on the display unit of an information processing apparatus for designation of a type of input device.

FIG. 21 is a flow chart for explaining the procedures of image data input/output processing of this embodiment. In step S10, display is made for designate a type of input device. In step S11, the type of input device is designated. FIG. 22 is a view showing a display state on the display unit of the information processing apparatus 1310 upon designation of the type of input device. Referring to FIG. 22, a graphic cursor 1400 is operated using, e.g., a pointing device to designate a desired input device. When the graphic cursor 1400 is moved onto a scanner selection button 1401 and clicked, a scanner is set as a selection candidate. At this time, "scanner" is displayed in a display area 1403, and the display state of the scanner selection button 1401 is displayed so as to allow discrimination from the remaining device selection buttons. In this state, the graphic cursor 1400 is moved onto a determination key 1402 and clicked, thereby setting a scanner as the type of input device.

In this manner, the type of input device is designated, and the flow advances from step S11 to step S12. In step S12, the information processing apparatus 1310 obtains device information including status information and setting position information from usable input/output devices. For example, status information representing "BUSY" and setting position information representing "3F-B block" are transferred from a virtual optical scanner 1302. Information representing "TRANSMISSION" and "3F-C block" are transferred from a LAN-connectable facsimile transmission/reception device 1304. Similarly, the information processing apparatus 1310 collects device information of each device on the LAN. In this embodiment, device information is collected at the time of use (step S12). However, device information of each equipment may be collected by periodical polling operations.

The information obtained in the above manner is stored in a device table in the memory of the information processing apparatus 1310. FIG. 26 is a view showing the data structure of a device table. The information of each equipment, which is obtained in the above step S12, is stored in the device table. Therefore, the setting position and status information can be obtained with reference to this device table.

Figure 23:
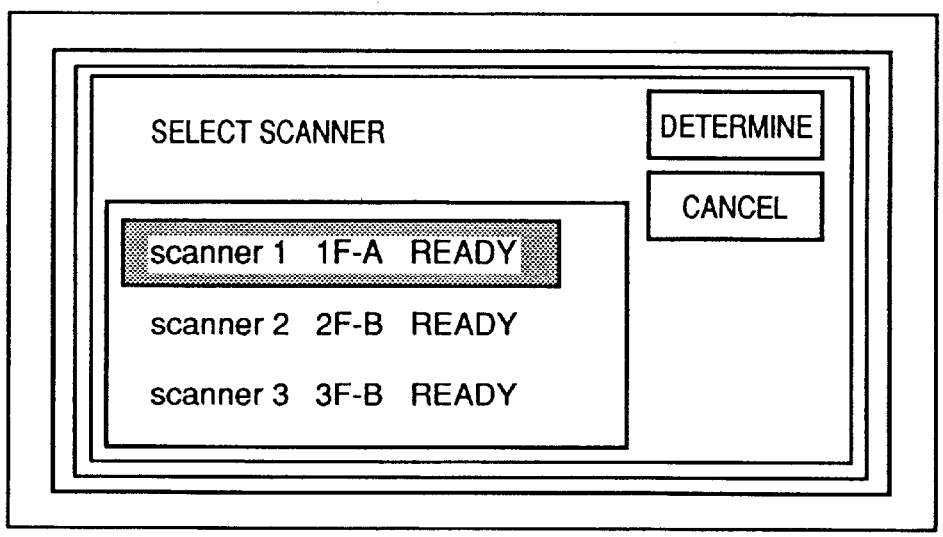
FIG. 23 is a view showing the display state of the list of input devices belonging to the designated type.

In step S13, the list of input devices belonging to the designated type is displayed, as shown in FIG. 23. On the basis of the device information (device table in FIG. 26) obtained in step S12, the setting position information (e.g., "1F-A") and status information (e.g., "READY" and "BUSY") are displayed on the display unit of the information processing apparatus.

In step S14, the operator designates whether input device selection processing is performed in an "automatic mode" or "manual mode". If the manual mode is selected, the flow advances to step S15 to wait selection input of a target equipment. On the other hand, if the automatic mode is selected, the flow advances to step S16 to automatically select an optimal input device on the basis of the collected device information. This selection between the automatic mode and the manual mode may be performed every time an input device is to be selected. Alternatively, the automatic mode or the manual mode may be set in advance.

If the manual mode is selected, the flow advances to step S15, and the operator designates a target input device with reference to the displayed information shown in FIG. 23. For this designation, the same method as in designation of the type (method using a graphic cursor) can also be applied. As a result, the operator can determine from the displayed information in FIG. 23 that an optical scanner 1303 near the information processing apparatus 1310 on the first floor is "READY" and can be selected. When an original image is input from a person on the second floor, "scanner 2 (a reader unit 1 of a system equipment 100)" can be selected in the display screen in FIG. 23. In this manner, a target input device is determined when the operator selects an optical scanner device in accordance with the display screen. With this operation, the selected scanner device is reserved and prevented from being selected by another information processing apparatus.

On the other hand, if the automatic mode is selected, the flow advances from step S14 to step S16. In step S16, an optimal input device is automatically selected on the basis of the device information of each input device, which is collected in step S12. Various selection conditions can be considered. Assume that an equipment physically near to the information processing apparatus 1310 being operated is preferentially selected. In this case, "scanner 1" on the first floor is automatically selected. If an equipment which is physically at a close position is busy, the second equipment physically at the second closest position is automatically selected.

Upon completion of designation of an input device, an output device is designated.

Figure 24:
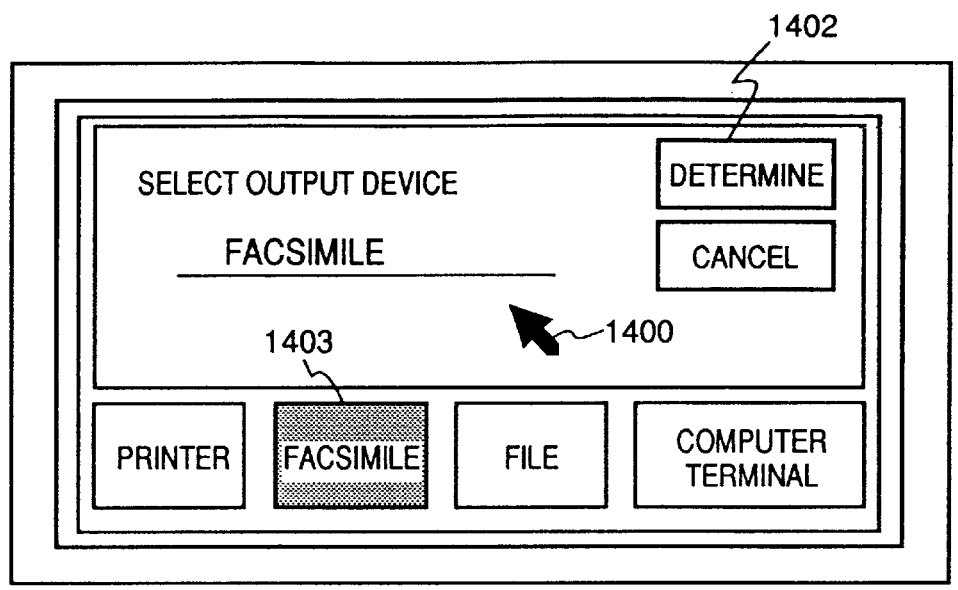
FIG. 24 is a view showing a display state on the display unit of the information processing apparatus for designation of a type of output device.

In step S17, the types of output devices are displayed FIG. 24 is a view showing a display state on the display unit of the information processing apparatus 1310 at the time of designation of the type of an output device. With the same procedures as in designation of the type of input device (step S11), a type of output device is designated (step S18). In this example, a facsimile device is designated.

Figure 25:
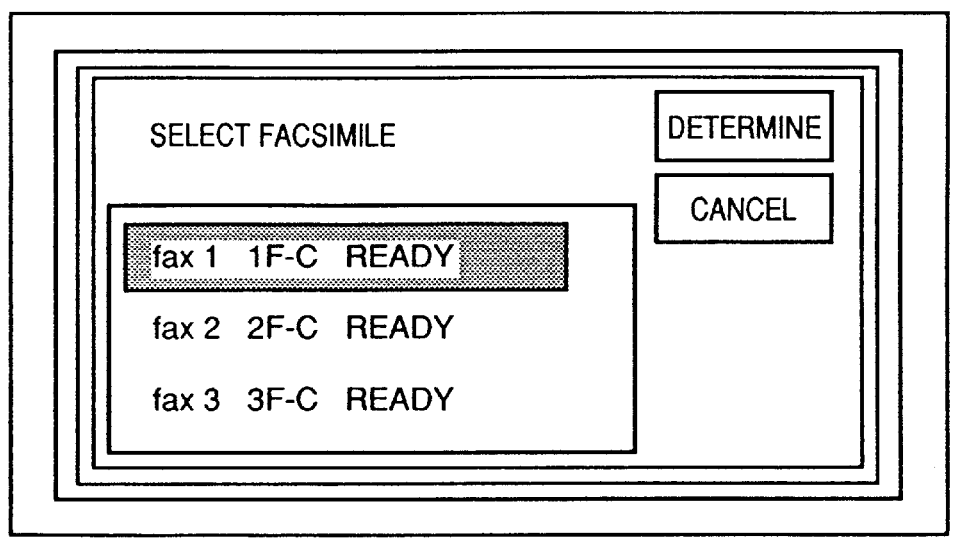
FIG. 25 is a view showing the display state of the list of output devices belonging to the designated type.

When the type of output device is designated, the flow advances from step S18 to step S19 to display the list of output devices. In step S19, the list of output devices belonging to the designated type is displayed as shown in FIG. 25. The setting position information and the status information of each output device are displayed with reference to the device information obtained in step S12.

In step S20, it is determined whether output device selection processing is to be automatically performed (automatic mode) or manually performed (manual mode). If the manual mode is selected, the flow advances to step S21, and the operator designates a desired output device (in this example, a facsimile device) with reference to the setting position information and the status information.

On the other hand, if the automatic mode is selected, the flow advances from step S20 to step S22, and an output device is automatically selected on the basis of the device information. In this example, an output device is selected with reference to the setting position information such that a device physically near to the information processing apparatus 1310 being operated is preferentially used.

As described above, the operator can select a desired facsimile transmission/reception device as an output device for facsimile transmission of an original image. Generally, however, a receiver is not concerned with a facsimile device from which an image is transmitted. Therefore, when a facsimile device is designated as the type of output device, the information processing apparatus 1310 may automatically select a facsimile terminal 1307 having a short data path on the basis of the setting position information. This is important to prevent an undesirable increase in traffic on the LAN.

In this manner, the scanner 1303 and the facsimile device 1307 are designated as input and output devices. In accordance with a command from the information processing apparatus 1310, an original image input from the scanner 1303 is transferred to the facsimile transmission/reception device 1307 through the LAN, and the facsimile device 1307 performs call origination to a designated dial number, thereby transmitting the image.

In this embodiment, the communication line connected to virtual devices is a LAN (Local Area Network). However, as the communication line, any generally known communication line such as a WAN (Wide Area Network) may also be used. As devices connected to the communication line, any device may be used as far as it can be connected to the generally known communication line.

In the above embodiment, an original image input from an optical scanner device is output to a facsimile transmission/reception device. However, a combination of input and output devices is not limited to this, as a matter of course. As an input/output device, a device capable of inputting or outputting image information, i.e., a facsimile transmission/reception device, an external memory device, a computer terminal through an interface can also be used. When these input/output devices are selected, the above-described procedures of input/output device selection processing or various display contents can also be applied, as a matter of course.

Instead of input/output device selection processing by the operator from an information processing apparatus, the operating unit 115 of the image processing apparatus 100 may be used, as in the first embodiment.

As described above, according to this embodiment, device information including status information and setting position information of each device is used. With this operation, when an input/output device is to be manually or automatically selected, disadvantages such as selection of a device at a distant position can be prevented.

The present invention may be applied to a system constituted by a plurality of equipments or an apparatus constituted by one equipment. The present invention can also be applied when it is achieved by supplying a program for executing processing defined by the present invention to the system or apparatus, as a matter of course.

AS many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a reader, which reads an image on a document;
   an operation panel, which enters a manipulation regarding a reading operation of said reader by a user and displays various information;
   a connector, which connects to a network for connecting a plurality of devices;
   a determiner, which determines setting position each of the plurality of devices connected to the network through said connector; and
   a controller, which controls said operation panel such that said the plurality of devices are displayed on said operation panel with the setting position determined by said determiner, wherein the plurality of devices are classified into groups based on their types, and a device belonging to one of the groups is displayed.

2. An apparatus according to claim 1, further comprising a printer which prints an image based on an image data from said reader.

3. An apparatus according to claim 1, further comprising a selector which selects one of the plurality of the devices.

4. An apparatus according to claim 1, wherein the plurality of the devices includes a printer for printing an image.

5. An apparatus according to claim 1, wherein the plurality of the devices includes a reader.

6. An apparatus according to claim 1, wherein the plurality of the devices includes a facsimile apparatus.

7. An apparatus according to claim 1, wherein said controller causes said operation panel to display the plurality of devices with a status of each of the devices.

8. An image processing apparatus comprising:

an output device, which outputs an image data;

an operation panel, which enters a manipulation for operating said apparatus by a user and displays various information;

a connector, which connects to a network for connecting a plurality of output devices; and a controller, which controls said operation panel such that said output device and the plurality of output devices connected to the network through said connector are displayed on said operation panel so as to allow discrimination between output devices in the image processing apparatus and those connected to the network.

9. An apparatus according to claim 8, further comprising a reader which reads an image on a document, wherein said operation panel enters the manipulation regarding a reading operation of said reader.

10. An apparatus according to claim 8, wherein said output device and the output devices connected through said connector output the image data input from said reader.

11. An apparatus according to claim 8, wherein said output device is a printer.

12. An apparatus according to claim 8, wherein said output device is a facsimile apparatus.

13. An apparatus according to claim 8, wherein said controller causes said operation panel to display the plurality of devices sorted each type of the devices.

14. An apparatus according to claim 8, further comprising a selector which selects said output device or one of the plurality of the output devices.

15. A control method of an image processing apparatus having at least a reader for reading an image on a document, an operation panel for entering a manipulation regarding a reading operation of said reader by a user and displaying various information and a connector for connecting said image reading apparatus to a network connecting a plurality of devices, said method comprising:

a determining step of determining setting position of each of the plurality of devices connected to the network through said connector; and a controlling step of controlling said operation panel such that said the plurality of devices are displayed on said operation panel with the setting position determined in said determining step, wherein the plurality of devices are classified into groups based on their types, and a device belonging to one of the groups is displayed.

16. A control method of an image processing apparatus having at least an output device for outputting an image data, an operation panel for entering a manipulation for operating said image processing apparatus and displaying various information and a connector for connecting said image processing apparatus to a network connecting a plurality of output devices, said method comprising:

a determining step of determining information regarding the plurality of output devices connected to the network through said connector; and a controlling step of controlling said operation panel such that said output device and the plurality of output devices connected to the network through said connector are displayed on said operation panel so as to allow between output devices in the image processing apparatus and those connected to the network.

17. A computer readable program for controlling an image reading apparatus having at least a reader for reading an image on a document, an operation panel for entering a manipulation regarding a reading operation of said reader by a user and displaying various information and a connector for connecting said image reading apparatus to a network connecting a plurality of devices, said method comprising:

a determining step of determining setting position of each of the plurality of devices connected to the network through said connector; and a controlling step of controlling said operation panel such that the plurality of devices are displayed on said operation panel with the setting position determined in said determining step, wherein the plurality of devices are classified into groups based on their types, and a device belonging to one of the groups is displayed.

18. A computer readable program for controlling an image processing apparatus having at least an output device for outputting an image data, an operation panel for entering a manipulation for operating said image processing apparatus and displaying various information and a connector for connecting said image processing apparatus to a network connecting a plurality of output devices, said method comprising:

a determining step of determining information regarding the plurality of output devices connected to the network through said connector; and a controlling step of controlling said operation panel such that said output and the plurality of output devices connected to the network through said connector are displayed on said operation panel so as to allow discrimination between output devices in the image processing apparatus and those connected to the network.

* * * * *

UNITED STATES PATENT AND TRADEMARK OFFICE
CERTIFICATE OF CORRECTION

PATENT NO. : 6,775,712 B2
DATED : August 10, 2004
INVENTOR(S) : Sakai et al.

It is certified that error appears in the above-identified patent and that said Letters Patent is hereby corrected as shown below:

Title page, Item [54] and Column 1, line 1,
Title, after "WHICH" insert -- A --

Title page,
Item [75], Inventors, after "Abe," delete "Tama" and insert -- Tokyo --

Column 4,
Line 15, delete "Tn" and insert -- In --

Column 13,
Line 34, delete "displayed FIG" and insert -- displayed. Fig --

Column 14,
Line 49, delete "AS" and insert -- As --

Signed and Sealed this

Eighth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,775,712 B2
DATED : August 10, 2004
INVENTOR(S) : Sakai et al.

It is certified that error appears in the above-identified patent and that said Letters Patent is hereby corrected as shown below:

<u>Title page,</u>
Item [56], References Cited, U.S. PATENT DOCUMENTS, add
-- 4,360,870   *   11/1982   McVey   710/306 --

<u>Column 1,</u>
Line 1, after "WHICH" insert -- A --

Signed and Sealed this

Tenth Day of May, 2005

JON W. DUDAS
*Director of the United States Patent and Trademark Office*